United States Patent [19]

Tork et al.

[11] Patent Number: 4,880,673

[45] Date of Patent: Nov. 14, 1989

[54] ACRYLATE BINDER AND ITS USE FOR DRESSING LEATHER

[75] Inventors: Leo Tork, Leverkusen; Hans-Günter Vogt, Dormagen, both of Fed. Rep. of Germany; Ferdinand Heins, Kapellen, Belgium

[73] Assignee: Bayer Aktiengesellschaft, Leverkusen, Fed. Rep. of Germany

[21] Appl. No.: 240,138

[22] Filed: Sep. 2, 1988

Related U.S. Application Data

[63] Continuation of Ser. No. 25,998, Mar. 16, 1987, abandoned.

[30] Foreign Application Priority Data

Mar. 27, 1986 [DE] Fed. Rep. of Germany ....... 3610576

[51] Int. Cl.$^4$ .................. B32B 27/36; B32B 9/02; B05D 1/36
[52] U.S. Cl. .................................... 427/412; 428/473
[58] Field of Search ................. 526/318; 427/412; 428/473

[56] References Cited

U.S. PATENT DOCUMENTS

| | | | |
|---|---|---|---|
| 4,042,645 | 8/1977 | Hirota et al. | 526/318 |
| 4,137,389 | 1/1979 | Wingler et al. | 526/318 |
| 4,289,678 | 9/1981 | Calder et al. | 526/318 |
| 4,424,298 | 1/1984 | Penzel et al. | |
| 4,491,612 | 1/1985 | Fischer | |

*Primary Examiner*—Joseph L. Schofer
*Assistant Examiner*—N. Sarofim
*Attorney, Agent, or Firm*—Connolly and Hutz

[57] ABSTRACT

Acrylate binders consist of (a) 38 to 98% by weight of a $C_2$–$C_8$-alkyl acrylate, (b) 1 to 6% by weight of (meth-)acrylic acid, (c) 0 to 30% by weight of acrylonitrile, (d) 0 to 60% by weight of methyl methacrylate and (e) 0 to 10% by weight of one or more other comonomers containing no acid, basic or crosslinking groups and are obtainable by copolymerization of the monomers in the presence of 0.02 to 0.5% by weight of an organic peroxo compound and 1.0 to 5.0% by weight of an anionic emulsifier, the percentage data relating to the sum of (a) to (e), are particularly suitable for dressing leather.

5 Claims, No Drawings

ACRYLATE BINDER AND ITS USE FOR DRESSING LEATHER

This application is a continuation of application Ser. No. 07/025,998 filed Mar. 16, 1987 now abandoned.

The invention relates to a novel acrylate binder of an alkyl acrylate, acrylic acid or methacrylic acid, if appropriate methyl methacrylate, acrylonitrile and if appropriate other comonomers containing no acid, basic or crosslinking groups, its preparation in the presence of certain amounts of organic peroxo compounds and certain amounts of anionic emulsifiers, preferably avoiding nonionic emulsifiers, and a process for dressing leather with an aqueous system which is free from organic solvents and in which the abovementioned binders are employed as polymer dispersions in the primer and the finish.

The aim of a leather dressing is to impart to the tanned and, if appropriate, dyed dry hides the desired appearance and the desired sensory properties and physical properties, for example wet and dry adhesion, wet and dry breaking strength, wet and dry fastness to rubbing and resistance to solvents. These properties were previously to be achieved in an optimum manner only with systems which contained organic solvents at least in the effect colour and finish. For ecological and economic reasons, however, it has become necessary to realize dressing of the leather with purely aqueous systems. Previous attempts on this basis have not yet been satisfactory, because in each case at least one of the properties required could not be achieved or because the proposed solution was too expensive.

DE-OS (German Published Specification) No. 3,228,128 thus proposes, for example, the use of dispersions containing at least 2 chemically very different copolymers in dispersed form, one of which is built up from 30 to 85% by weight of (meth)acrylate, 1 to 8% by weight of comonomer containing carboxyl groups and 7 to 70% by weight of other monomers and the other of which is built up from 50 to 95 by weight of vinylidene chloride, 10 to 40% by weight of (meth)acrylate and 1 to 5% by weight of a monomer containing at least one group capable of crosslinking, for the primer. At least one other polymer which differs form the two primer polymers is then required for the finish.

It has now been found that the object stated can be achieved with only one type of dispersions of polymers if the polymer therein is built up from certain monomers in certain amounts under certain conditions.

The invention therefore relates to acrylate binders of (a) 38 to 98% by weight of a $C_2$–$C_8$-alkyl acrylate, (b) 1 to 6% by weight of (meth)acrylic acid, (c) 0 to 30% by weight of acrylonitrile, (d) 0 to 60% by weight of methyl methacrylate and (e) 0 to 10% by weight of one or more other comonomers containing no acid, basic or crosslinking groups and is obtainable by copolymerization of the monomers in the presence of 0.02 to 0.5% by weight of an organic peroxo compound and 1.0 to 5.0% by weight of an anionic emulsifier, the percentage data relating to the sum of (a) to (e).

Preferred ranges for the primer are: 56 to 98% by weight of (a), 2 to 4% by weight of (b), 0 to 25% by weight of (c), 0 to 40% by weight of (d), 0 to 5% by weight of (e), 0.05 to 0.2% by weight of peroxo compound and an emulsifier amount of 2.0 to 4.0% by weight.

Preferred ranges for the finish are: 38 to 80% by weight of (a), 2 to 4% by weight of (b), 10 to 20% by weight of (c), 0 to 40% by weight of (d), 0 to 5% by weight of (e), 0.05 to 0.2% by weight of peroxo compound and an emulsifier amount of 2.0 to 4.0% by weight.

Especially preferred ranges for the primer are 65 to 98% by weight of (a), 2 to 4% by weight of (b), 0 to 18% by weight of (c) and 0 to 15% by weight of (d); and for the finish are 46 to 60% by weight of (a), 2 to 4% by weight of (b), 12 to 20% by weight of (c) and 20 to 34% by weight of (d).

The presence of non-ionic emulsifiers is preferably to be avoided. The polymerization conversion is preferably greater than 90%, in particular greater than 94%, an error limit of ±1% being assumed for the conversion determination.

Preferably, the polymer consists only of components (a) to (d), ethyl acrylate or n-butyl acrylate being preferred for (a) and methacrylic acid being preferred for (b).

Other monomers (e) are, for example, vinyl acetate, acrylamide, methacrylamide and styrene.

Suitable peroxo compounds are, for example, acyl hydroperoxides, diacyl peroxides, alkyl hydroperoxides, dialkyl peroxides and esters, such as tert.-butyl perbenzoate.

The organic peroxo compounds listed as examples can also be used in combination with suitable reducing agents in a known manner. Examples which may be mentioned of such reducing agents are: sulphur dioxide, alkali metal disulphites, alkali metal and ammonium bisulphites, thiosulphate, dithionite and formaldehyde sulphoxylate, and furthermore hydroxylamine hydrochloride, hydrazine sulphate, iron(II) sulphate, tin(II) chloride, titanium(III) sulphate, hydroquinone, glucose, ascorbic acid and certain amines.

Preferably, alkyl hydroperoxides are employed together with formaldehyde sulphoxylate in a molar ratio of 5:1 to 1:5.

It is frequently advisable to carry out the polymerization in the presence of promoters. Suitable promoters are, for example, small amounts of metal salts, the cations of which can exist in more than one valency level, for example salts of copper, manganese, iron, cobalt and nickel.

It is occasionally advisable to carry out the emulsion polymerization in the presence of buffer substances, chelating agents and similar additives, the nature and amount of which are known to the expert.

Examples of anionic emulsifiers are salts of higher fatty acids and resin acids, higher fatty alcohol sulphates, higher alkyl sulphonates and alkylaryl sulphonates and condensation products thereof with formaldehyde, higher hydroxyalkyl sulphonates, salts of sulphosuccinic acid esters and sulphated ethylene oxide adducts.

Soft copolymers with a film hardness of 20° to 40° Shore A are preferably used for primers and harder polymers with a film hardness of 65° to 99° Shore A are preferably used for finishes. The film hardness in the primer and finish depends in a known manner on the type of leather and dressing. The degree of hardness can of course also be established as desired by mixing a soft copolymer according to the invention with a hard copolymer according to the invention.

In a preferred embodiment for use in practice, 100 parts by weight of a 15% strength by weight aqueous casein-fat emulsion are added per 1,000 parts by weight of priming liquor. The effect colour and finish contain, per 1,000 parts by weight, about 100 to 300 parts by weight of a 2% strength by weight aqueous thixotropic dispersio of a purified hectorite and 40 to 120 parts by weight of a 15% strength by weight aqueous ammoniacal casein solution and, based on the 30% strength by weight acrylate dispersion and 15% strength by weight casein solution employed, about 2 to 4% by weight of a polyfunctional aziridine compound or 5 to 6.5% by weight of 1,2,4-triglycidyl-triazolidine-3,5-dione as a crosslinking agent in the finishing batch and about 1 to 2% by weight of the aziridine crosslinking agent or 2 to 4% by weight of the epoxide crosslinking agent in the effect colour.

The effect colours contain binders which are built up from the same monomers as the acrylate binders according to the invention, within the limits stated. As regards their hardness, they are preferably between the primer binder and the finish binder and are prepared, in particular, by mixing these two binders.

The primers can of course also be crosslinked with the products suitable for crosslinking effect colours and finishes in order to improve the fastness properties. The dosage here, based on the polymer dispersion and casein solution, is 1 to 4% by weight.

It has been found that the new process is particularly suitable for dressing soft leathers which are milled. Particular demands are made on the dressing layer of milled nappa leathers: the dressing must be resistant to milling, that is to say it should not be damaged by milling in a drum; in particular, after milling, a leather which is as soft as possible and has a fine grain contour, a fine grain corn and small streaks must be obtained. Even with heavily coated leather, for example buffed furniture leather, the leather must appear natural and uncoated. Good fastness properties are of course required, for example in furniture nappa very good fastness to wet and dry rubbing and rubbing through.

In order to meet these requirements in dressing with customary binders, binder mixtures with a medium degree of hardness (35° to 50° Shore A) are used in the primer coats, and to achieve the required fastness properties, in particular the fastnesses to rubbing, either hard finishes of low elasticity based on collodion are applied in thin layers (small animal skins, upper nappa leather) or highly elastic finishes based on polyurethane are applied in a thick layer (furniture leather). If the leathers are to be milled after application of the finish, the milling time must be observed exactly. In particular, if the leathers are milled for too short a time, they do not become soft enough; if the leathers are milled for too long, in the case of collodion finishes cracking occurs in the finish layer and in the case of polyurethane finishes distortion occurs between the leather which is becoming ever softer and the elastic finish layer, which finally leads to looseness of the grain and swelling of the dressing layer. The leathers then appear overloaded with plastic.

Since the polymer dispersions according to the invention have less adhesion, have a higher pigment-carrying capacity and give dressings which are more resistant to rubbing, softer binders and more pigment can be used in the primer in the new process, and moreover the primer can be applied in a thinner layer. This change in the recipe gives softer leathers which have a finer grain contour and appear to have less coating and therefore to be more natural.

Because of their high pigment-carrying capacity, their high transparency and their good dry and wet adhesion, the use of the dispersions according to the invention as binders for aqueous pastes of organic pigments in purely aqueous effect colours, in particular in combination with a 2% strength by weight aqueous thixotropic dispersion of a purified hectorite, is particularly advantageous. Using these effect colours, coloristic effects can be sprayed or applied by the roller application process in just as sharp accentuation as is otherwise only possible with purely organic systems, for example based on collodion lacquers or polyurethane lacquers. The customary casein solutions can be added for any increase in gloss and brilliance desired.

A particular advantage for the film elasticity of the effect colour and in particular for the adhesion between the effect colour and primer and between the effect colour and finish is the possibility of being able to employ substantially larger amounts of binder in the aqueous effect colour than is possible with organic systems, without the effect design thereby suffering. For example, for 50 parts by weight of organic pigment paste, using collodion lacquers as binders for effect colours, about 7.5 to 15 parts by weight of collodion solid substance are available, in comparison with 105 to 135 parts by weight of polymer solid substance in the process according to the invention.

A further increase in the film elasticity of the effect colour and the adhesion between the dressing layers results from the possibility of crosslinking the dispersions according to the invention with known epoxide and aziridine crosslinking agents. If, for example, the leathers are embossed or ironed at high temperatures under high pressure or stored for a prolonged period before application of the effect colour, perfect adhesion between the various dressing layers is achieved by crosslinking even on such highly sealed-off primers.

The film elasticity of the effect colour and finish can be established as desired, according to requirements, because the acrylate dispersions can be prepared in virtually any degree of elasticity and plasticity, because relatively high amounts of binder can be employed in the effect colour without the resulting effect suffering, and finally because not only the adhesion but also the elasticity of the dressing film can be increased further by crosslinking the dispersions.

The polymer dispersions according to the invention also offer substantial advantages as binders in final finishes:

The finishes are resistant to amines, stable to heat and fast to light. They can be adjusted to any desired degree of elasticity and hardness. To achieve the required fastness properties, the finish films can be less hard but more elastic than collodion finishes and thinner, softer and less elastic in comparison with finishes based on polyurethane. The adhesion to the primer or effect colour is perfect, even on highly sealed-off primers, if crosslinking is carried out - analogously to the effect colours. The wet and dry fastnesses to rubbing and the resistance to milling are outstanding, and especially if the dispersions are crosslinked. Using casein, the handle can be adjusted in the direction of smooth and dry and the glass can be increased. Other customary auxiliaries for regulating the handle can be added without impairment of the other properties.

Dressing of the leathers with the acrylate dispersions to be used according to the invention is carried out in a manner which is customary per se. Processing can be carried out on full grain and buffed leather of any origin and on leather fibre materials. The dressings are applied to the leather in a manner which is known per se using the polymer dispersions according to the invention, commercially available top dressing pastes and other additives. The dressings can be applied by spraying, brushing, flushing, pouring, coating or roller application processes. The amount of dressing depends on the nature and pretreatment of the leathers and can easily be determined by preliminary experiments.

Priming is carried out in one or more applications - intermediate drying at 60° to 90° C. within a few minutes. In the case of leather substrates, good fusion and thereby a good sealing of the primer is achieved by hot intermediate pressing or grain embossing. Further top dressing coats can then be applied with the same liquor or with a darker effect colour.

By adding thickening agents, for example based on polyglycol-polyurethanes, vinylpyrrolidone or high molecular weight copolymers based on acrylic acid, it is possible to regulate the viscosity of the dressing liquors so that the penetration capacity can easily be reduced by increasing the viscosity. The thickened priming liquors are particularly suitable for dressing buffed leather because of the higher filling effect thereby caused and the improved film-forming capacity.

Guideline recipes for primers containing the acrylate dispersions according to the invention for various types of leather and colour shades are given in the following table.

|  | Parts by weight |
|---|---|
| 15 to 20% strength by weight commercially available aqueous dyestuff solutions | 0–50 |
| 15 to 20% strength by weight organic pigment pastes (EP-OS (European Published Specification) 86,354) | 50–100 |
| 2% strength by weight aqueous dispersion of purified hectorite | 100–300 |
| 15% strength by weight aqueous ammoniacal casein solution | 0–100 |
| make up with water to | 1,000 |
| 30% strength by weight acrylate dispersions according to the invention (also mixtures thereof, film hardness 40–85° Shore A) | 350–450 |
| cross linking agent based on aziridine or epoxide, for example 1,2,4-triglycidyl-triazolidine-3,5-dione | 0–27 |
| about | 1,000 |

The effect colours can also be applied by means of roller application machines. The viscosity required for this process is established by reducing the addition of water.

After the primer or effect colour, the acrylate dispersion for the final finish is applied in the customary manner, for example in 1 to 2 spray applications with intermediate drying at 60° to 90° C. in the course of a few minutes. Depending on the type of leather, hydraulic after-pressing is then carried out, if appropriate at 60° to 170° C. on a run-through ironing machine and if appro-

| Guideline recipes for primers containing acrylate dispersions according to the invention (Pigment pastes according to EP-OS (European Published Specification) 86,354) | | | | | | | | | |
|---|---|---|---|---|---|---|---|---|---|
| Type of Leather | Small animal skins | | | Full grain nappa | | | Buffed nappa | | |
| Black pigment paste (16% strength by weight carbon black finish) | 80 | — | — | 80 | — | — | 80 | — | — |
| Brown pigment paste (55% strength by weight iron oxide finish) | — | 100 | — | — | 100 | — | — | 100 | — |
| White pigment paste (65% strength by weight titanium dioxide finish) | — | — | 150 | — | — | 150 | — | — | 150 |
| 15% strength by weight aqueous ammoniacal casein solution | — | — | — | — | — | — | 50 | 50 | 50 |
| 15% strength by weight aqueous casein-fat emulsion | 100 | 100 | 100 | 100 | 100 | 100 | 100 | 100 | 100 |
| 20% strength by weight aqueous paraffin-oleic acid emulsion | 40 | 40 | 40 | — | — | — | 0–30 | 0–30 | 0–30 |
| Water | 600 | 550 | 475 | 565 | 490 | 380 | make up to 1000 | | |
| Acrylate dispersions according to the invention, 30% strength by weight (and mixtures, film hardness 25–40° Shore A) | 180 | 210 | 235 | 235 | 290 | 350 | 290 | 350 | 460 |
| 30% strength by weight matting paste based on silicic acid | — | — | — | 0–20 | 0–20 | 0–20 | 0–30 | 0–30 | 0–30 |
| adjust to a viscosity of 16-22 s (measured in a Ford cup with a 4 mm nozzle) with thickener (copolymer based on acrylic acid) according to the absorption properties of the leathers | — | — | — | — | — | — | 40–100 | 40–100 | 40–100 |
| Total amount applied in g/m² in 2-4 spray applications | 60–100 | 60–100 | 60–100 | 80–120 | 80–120 | 80–120 | 120–180 | 120–180 | 120–180 |

The composition of the effect colours with the polymer dispersions according to the invention for application by a spraying machine is illustrated by the following guideline recipe:

priate finally at 60° to 100° C. under a low pressure (5 to 100 bar).

The finishing liquors can contain commercially available pigment preparations, dyestuff solutions and matting or handle agents. If aqueous casein solutions are added in relatively large amounts, known crosslinking agents based on aziridine or epoxide must be added to the finishing batch for the required wet-fastness properties.

The guideline recipes for purely aqueous finishes containing the acrylate binders according to the invention have the following composition:

|  | Parts by weight |
| --- | --- |
| 15 to 20% strength by weight commercially available dyestuff solutions | 0–10 |
| 15 to 20% strength by weight organic pigment pastes | 0–50 |
| 2% strength by weight aqueous dispersion of purified hectorite | 100–300 |
| 15% strength by weight aqueous ammoniacal casein solution | 0–150 |
| make up with water to | 1,000 |
| 30% strength by weight acrylate dispersions according to the invention (also mixtures thereof, film hardness 75–99° Shore A) | 300–350 |
| 30% strength by weight matting paste based on silicic acid | 0–30 |
| crosslinking agent based on aziridine or epoxide | 0–32 |
| about | 1,000 |

Dressings containing the polyacrylate dispersions according to the invention are distinguished in particular by excellent milling properties:

The leathers can be milled virtually for as long as desired until the leathers have the required degree of softness, without the finish tearing, as with collodion finishes, or the dressing layer becoming swollen and loose-grained, as with polyurethane finishes. Finally, very soft leathers with a fine grain contour, grain corn and small streaks is obtained. Even very heavily covered leathers, such as buffed furniture leathers, look very natural an uncoated.

Other advantages of the dressing process according to the invention are: a good penetration capacity of the primer liquors into the leather, very good flow of the dressing liquors, high elasticity, good dry and wet breaking strength, good dry and wet adhesion, very good fastnesses to rubbing, resistance to swelling in hot water, low-polluting.

It is of particular advantage for the process according to the invention if the average particle diameter of the polymer dispersions is less than 100 nm.

EXAMPLE 1

A polymer dispersion (I) which is prepared as follows is used as the primer binder for dressing sheep nappa clothing leather (colour shade medium brown):

POLYMER DISPERSION I

A solution of 3 g of Na dodecylbenzenesulphonate in 575 g of water is heated to 70° C. in a 4 l glass flask, the flask is flushed with nitrogen and 5% by weight of a mixture of 588 g of ethyl acrylate and 12 g of methacrylic acid is added. Activation is effected with 0.3 g of t-butyl hydroperoxide and 1.8 g of Na formaldehydesulphoxylate in the presence of small amounts of iron(II) sulphate. After the polymerization has started, the remaining 95% by weight of the monomer mixture is uniformly metered in over a period of 4 hours. Parallel to this, an aqueous feed consisting of 21 g of Na dodecylbenzenesulphonate, 0.6 g of t-butyl hydroperoxide and 718 g of water is fed in. The polymerization is carried out at 70° C. After a total of 5 hours, the solids content is 30.8% by weight (=94% conversion). The residual monomers are removed by degassing. The pH value is brought to 8 with aqueous ammonia and the final concentration is brought to 30% by weight. The film hardness is 26° Shore A and the particle size of the latex is <100 nm.

The primer liquor is prepared as follows using the resulting polyacrylate dispersion (I):

100 parts by weight of an iron oxide colour pasts mixture prepared according to Example 4 of EP-OS (European Published Specification) 86,354 are stirred with 100 parts by weight of a commercially available 15% strength by weight aqueous casein-fat emulsion and 40 parts by weight of a 20% strength by weight aqueous paraffin-oleic acid emulsion. 550 parts by weight of water and then 210 parts by weight of the 30% strength by weight polymer dispersion (I) described above are stirred into this mixture.

The sheepskins to be treated are given 2 to 4 applications by means of a spraying machine. The total amount applied is 60 to 100 g per m$^2$ of leather surface. If it is a very coarse-pored leather, the skins are subjected to intermediate pressing after the second colour application and drying at 60° C. under 100 bar.

After priming, a polymer dispersion (II) which is prepared as follows is used as the finish binder.

POLYMER DISPERSION II

The preparation is carried out as for polymer dispersion I, but the monomers employed are: 312 g of n-butyl acrylate, 168 g of methyl methacrylate, 108 g of acrylonitrile and 12 g of methacrylic acid. The aqueous feed consists of 15 g of Na dodecylbenzenesulphonate, 0.6 g of t-butyl hydroperoxide and 716 g of water.

After a polymerization time of 5 hours in total, the solids content is 31.5% by weight (=96% conversion). The residual monomers are removed by degassing. The pH value is brought to 8 with aqueous ammonia and the final concentration is brough to 30%. The film hardness is 72° Shore A and the particle size of the latex is <100 nm.

The finish liquor is prepared as follows with the resulting polymer dispersion (II):

300 parts by weight of the 30% strength by weight polymer dispersion (II) are thickened with 200 parts by weight of a 2% strength by weight aqueous dispersion of a commercially available hectorite. The mixture is diluted with 470 to 490 parts by weight of water and 10 to 30 parts by weight of the matting paste described in EP-OS (European Published Specification) 86,354, Example 3, are then added to establish the desired matting level.

To regulate the handle, customary handle agents, for example emulsions of silicone oil, fatty acid amide or wax, can be added to the finish batch or can also be sprayed onto the finished leather separately as lustres.

The finish liquor is applied to the leathers with 1 to 2 spray applications. After drying, the skins are shaved under dry conditions to uniform thickness and then milled for 6 to 12 hours. If a very smooth leather handle is desired, the skins are finally pressed on a cylindrical pressing machine customary for small animal skins at 60° C. under a low pressure.

The resulting dressing has the advantageous properties mentioned in the description. In spite of their heavy cover, the leathers appear to be very natural and uncoated and are not hardened by the dressing. The handle of the leathers is also pleasant and natural without addition of handle agents to the finish liquor. The fastnesses to wet and dry rubbing are better than with dressings with customary polymer dispersions in the primer and aqueous collodion lacquer emulsions in the finish.

EXAMPLE 2

A polymer dispersion (III) which was prepared according to Example 1 with the following monomer mixture is used as the primer binder for dressing full-grained nappa cowhide for shoes.

POLYMER DISPERSION III

Monomer mixture:

68% by weight of n-butyl acrylate, 12% by weight of methyl methacrylate, 18% by weight of acrylonitrile and 2% by weight of methacrylic acid.

The primer liquor is prepared as follows using the polymer dispersion (III), film hardness 38° Shore A:

100 parts by weight of a colour paste mixture prepared according to Examples 1, 4 and 5 of EP-OS (European Published Specification) No. 86,354 and with a cyclamen colour shade are stirred with 100 parts by weight of a commercially available 15% strength by weight aqueous casein-fat emulsin. 490 parts by weight of water, 290 parts by weight of the polymer dispersion (III) described above and, finally, 20 parts by weight of the matting paste described in EP-OS (European Published Specification) 86,354, Example 3, are then added.

The upper shoe leather to be treated is given two colour applications on a spray machine with intermediate drying at 70° to 80° C., the first application being sprayed particularly saturatedly. After drying, the leathers are intermediately pressed at 80° C. and 50 bar and are given another spray application with the same liquor. Total amount applied: 80 to 120 g per m². After the last spray application and drying, the leathers are embossed with a wild goat grain at 90° C. under 200 bar over a residence time of 5 seconds.

The effect is then sprayed with a colour batch prepared as follows:

15 parts by weight of a commercially available 15 to 20% strength by weight aqueous dyestuff solution and 50 parts by weight of a colour paste mixture of 15 to 20% strength by weight organic pigment finishes, prepared acording to Example 5 of EP-OS (European Published Specification) No. 86,354, and the TiO₂ paste described in Example 1 of the same patent, in a colour shade established as darker than the primer are stirred with 40 parts by weight of a 15% strength by weight aqueous ammoniacal casein solution, 250 parts by weight of a 2% strength by weight aqueous dispersion of purified hectorite and 265 parts by weight of water until the mixture is completely homogeneous. 240 parts by weight of the soft polymer dispersion (III) used in the primer and 110 parts by weight of the harder polymer dispersion (IV) used as the finishing agent in this example are stirred into this mixture.

Finally, shortly before processing of the liquor, 10 parts by weight of 1,2,4-triglycidyltriazolidine-3,5-dione, dissolved in 20 parts by weight of water, can be added to the batch for crosslinking.

The finished effect colour is applied with a spray machine in 2 to 3 machine passes.

The finish containing the polymer dispersion (IV) which has been prepared according to Example 1 with the following monomer composition is then applied.

POLYMER DISPERSION IV

Monomer composition:

48% by weight of n-butyl acrylate, 32% by weight of methyl methacrylate, 18% by weight of acrylonitrile and 2% by weight of methacrylic acid.

The finish batch is prepared as follows with the 30% strength by weight polymer dispersion (IV), film hardness 88° Shore A, brought to pH 8:

5 parts by weight of commercially available 15% strength by weight dyestuff solution are stirred thoroughly with 100 parts by weight of a 2% strength by weight aqueous dispersion of a purified hectorite, 40 parts by weight of a 15% strength by weight aqueous amnmoniacal casein solution and 495 parts by weight of water. 300 parts by weight of the polymer dispersion (IV) described above are introduced into the homogeneous mixture and, shortly before use, 20 parts by weight of 1,2,4-triglycidyltriazolidine-3,5-dione, dissolved in 40 parts by weight of water, can be added as a crosslinking agent.

The leathers are given a spray coating with the finish batch, are conditioned in air, after drying, and then milled for 6 hours. A second finish is then applied, but this time without the dyestuff solution. Finally, the leathers are pressed off hydraulically at 80° C. under 100 bar for a residence of ½ second.

The technological properties of the dressing comply with the advantageous properties described in the general section. The leathers are exceptionally elegant in aspect and handle and are distinguished by a high level of physical fastness properties, in particular in respect of breaking strength and stability towards rubbing. The leathers thus meet, to a high degree, all the requirements imposed on a shoe upper leather.

EXAMPLE 3

A polyacrylate dispersion (V) is employed for dressing full-grained nappa leather for upholstered fruniture. This dispersion is prepared according to Example 1, with the following monomer composition.

POLYMER DISPERSION V

Monomer composition:

73% by weight of n-butyl acrylate, 18% by weight of acrylonitrile, 7% by weight of methyl methacrylate and 2% by weight of methacrylic acid.

The colour batch for the primer is prepared in the following manner with the 30% strength by weight polymer dispersion (V), film hardness 36° Shore A, brought to a pH value of 8:

100 parts by weight of an iron oxide pigment colour paste mixture prepared according to Example 4 of EP-OS (European Published Specification) No. 86,354 are stirred with 100 parts by weight of a commercially available 15% strength by weight aqueous casein-fat emulsion. 490 parts by weight of water, 290 parts by weight of the polymer dispersion (V) and 20 parts by weight of the matting paste described in EP-OS (European Published Specification) No. 86,354, Example 3, are stirred in succession into this mixture.

The premilled and subsequently tensioned furniture leathers are given a saturated application of colour by means of a spray machine and, after drying, another application, but this time less thick. The total amount of primer applied is 80 to 120 g per m². After the last application of primer and drying, the leathers are pressed off at 80° C. under 50 bar.

The final finish containing, as the binder, the polymer dispersion (IV) used in Example 2 is then applied.

The finish liquor is prepared as follows:

350 parts by weight of the 30% strength by weight polymer dispersion (IV) and then, to regulate the gloss level, 10 to 30 parts by weight of the matting paste described in EP-OS (European Published Specification) 86,354, Example 3, are added to a homogeneously stirred mixture of 150 parts by weight of a 2% strength by weight aqueous dispersion of a purified hectorite and 50 parts by weight of a 15% strength by weight aqueous ammoniacal casein solution and 417 parts by weight of water. Shortly before processing of the liquor, 13 parts by weight of a polyfunctional aziridine compound are added, with thorough stirring, for crosslinking.

The finish batch is sprayed on in two applications by means of a spray machine. The leathers are intermediately dried and finally dried at 70° C., subsequently milled for 4 to 12 hours and finally pressed on a run-through pressing machine at 140° C.

The resulting leather is very soft and looks uncoated. The grain corn and grain contour are fine and the streaks are small. The dressing has all the properties required for upholstery furniture leather, such as elasticity, resistance to rubbing, fastness to light and stability towards amines.

EXAMPLE 4

The polymer dispersion (VI) which has been prepared according to Example 1 with the monomer mixture given below is used for dressing buffed nappa leather for upholstered furniture.

POLYMER DISPERSION VI

Monomer composition:

84% by weight of n-butyl acrylate, 12% by weight of acrylonitrile and 4% by weight of methacrylic acid.

The primer liquor is prepared as follows with the polymer dispersion (VI), film hardness 29° Shore A, brought to a pH value of 8:

100 parts by weight of an iron oxide pigmentcolour paste mixture prepared according to Example 4 of EP-OS (European Published Specification) No. 86,354 are intimately stirred with 100 parts by weight of a commercially available 15% strength by weight aqueous casein-fat emulsion, 50 parts by weight of a 15% strength by weight aqueous ammoniacal casein solution and 20 parts by weight of a customary 60% strength by weight weakly cationic emulsified groundnut oil emulsion a well as 340 parts by weight of water. 350 parts by weight of the polymer dispersion (VI) are added to this mixture. Finally, the colour liquor is brought to a viscosity which corresponds to a flow time of 16 to 22 seconds in a Ford cup with a 4 mm nozzle with a suitable thickening agent, for regulation of the depth of penetration into the grain layer. For leathers with a low absorption, the colour batch is thickened only slightly, if at all, whilst leathers with a higher absorption are treated with liquors of higher viscosity. In the case of hides which have a very high absorption, the leathers are pressed off at 70° to 120° C. under 100 bar on a run-through pressing machine before application of the colour.

After milling and tensioning, the buffed furniture leathers to be coated are given a saturated application of colour on a spray machine, and after drying at 70° C., 1 to 2 further spray applications are made, until the desired fullness and levelness of colour are obtained. The total colour application amount is 120 to 180 g per m² of leather surface. After drying, the hides are embossed with a fine pore grain at 80° C. under 120 bar with a delay of 1 to 4 seconds, and are then given an effect colour on a roller application machine, this colour being prepared in the following manner:

100 parts by weight of a colour paste mixture of 15 to 20% strength by weight organic pigment finishes, prepared according to Example 5 of EP-OS (European Published Specification) No. 86,354 in a contrast colour established as darker than the primer are homogeneously stirred with 90 parts by weight of a 15% strength by weight aqueous ammoniacal casein solution, 50 parts by weight of water and 300 parts by weight of a 2% strength by weight aqueous dispersion of a purified hectorite. 225 parts by weight of the soft polymer dispersion (VI) contained in the primer batch and 225 parts by weight of the harder polymer dispersion (IV) are added to this mixture, with thorough stirring. Shortly before use, 10 parts by weight of a polyfunctional aziridine compound are stirred into the effect colour batch for the purpose of crosslinking.

The effect colour is applied to the hide in one machine passage, for example with a cloud design, using a roller application machine.

Application of the finish and finishing of the leathers are then carried out, using the same recipe and procedure as in Example 3.

The leather has all the properties required for upholstered furniture leather, such as a soft handle like cloth, a fine grain contour and small streaks. The dressing is elastic, resistant to milling, resistant to rubbing, fast to light and stable towards amines.

We claim:

1. A process for dressing soft leather using acrylate binders for the primer and for the finish, comprising using
   (I) an acrylate binder comprising (a) 56 to 98% by weight of a $C_2$–$C_8$-alkyl acrylate, (b) 2 to 4% by weight (meth)acrylic acid, (c) 0 to 25% by weight acrylonitrile, (d) 0 to 40% by weight methyl methacrylate and (e) 0 to 5% by weight of one or more other comonomers containing no acidic, basic or crosslinking groups, having a film hardness of 25° to 40° Shore A, for the primer and
   (II) an aqueous dispersion containing an acrylate binder comprising (a) 38 to 80% by weight of a $C_2$–$C_8$-acrylate, (b) 2 to 4% by weight of (meth)acrylic acid, (c) 10 to 20% by weight of acrylonitrile, (d) 0 to 40% by weight methyl methacrylate and (e) 0 to 5% by weight of one or more other monomers containing acidic, basic of crosslinking groups, having a film hardness of 75° to 99° Shore A, for the finish,
   where the binders are obtained by copolymerizing the monomers in the presence of 0.02 to 0.5% by weight of an organic peroxo compound and 1.0 to 5.0% by weight of an anionic emulsifier, the percentages relating to the sum of (a) to (e).

2. A process according to claim 1, wherein I comprises 65 to 98% by weight of (a), 2 to 4% by weight of (b), 0 to 18% by weight of (c) and 0 to 15% by weight of (d).

3. A process according to claim 1, wherein the acrylate binders are obtained in the presence of 0.05 to 0.2% by weight of peroxo compound and 2.0 to 4.0% by weight of emulsifier.

4. A process according to claim 1, wherein (a) is ethyl acrylate or n-butyl acrylate and (b) is methacrylic acid.

5. A process according to claim 1, wherein the acrylate binders are prepared in the presence of an alkyl hydroperoxide and sodium formaldehyde sulphoxylate.

* * * * *

UNITED STATES PATENT AND TRADEMARK OFFICE
CERTIFICATE OF CORRECTION

PATENT NO. : 4,880,673
DATED : NOVEMBER 14, 1989
INVENTOR(S) : TORK ET AL

It is certified that error appears in the above-identified patent and that said Letters Patent is hereby corrected as shown below:

In Column 12, line 44, "$C_2$-$C_8$-acrylate," should read --$C_2$-$C_8$-alkylacrylate,--.

In Column 12, line 48, please insert the word --no-- prior to "acidic".

Signed and Sealed this

Eighteenth Day of August, 1992

Attest:

DOUGLAS B. COMER

*Attesting Officer*   *Acting Commissioner of Patents and Trademarks*